United States Patent [19]

Ostlinning et al.

[11] Patent Number: 4,663,430

[45] Date of Patent: May 5, 1987

[54] PROCESS FOR THE PREPARATION OF HIGH MOLECULAR WEIGHT POLYARYLENE SULPHIDE IN THE ABSENCE OF WATER

[75] Inventors: Edgar Ostlinning, Duesseldorf; Karsten Idel, Krefeld, both of Fed. Rep. of Germany

[73] Assignee: Bayer Aktiengesellschaft, Leverkusen, Fed. Rep. of Germany

[21] Appl. No.: 815,532

[22] Filed: Jan. 2, 1986

Related U.S. Application Data

[63] Continuation of Ser. No. 608,497, May 9, 1984, abandoned.

[30] Foreign Application Priority Data

May 20, 1983 [DE] Fed. Rep. of Germany ....... 3318401

[51] Int. Cl.[4] .............................................. C08G 75/14
[52] U.S. Cl. ..................................................... 528/388
[58] Field of Search ......................................... 528/388

[56] References Cited

U.S. PATENT DOCUMENTS

| | | | |
|---|---|---|---|
| 3,354,129 | 11/1967 | Edmonds | 528/388 |
| 4,064,114 | 12/1977 | Edmonds | 528/388 |
| 4,232,142 | 11/1980 | Barr et al. | 528/125 |
| 4,368,321 | 1/1983 | Sherk et al. | 528/388 |
| 4,371,671 | 2/1983 | Anderson | 528/388 |
| 4,433,138 | 2/1984 | Idel et al. | 528/388 |
| 4,595,748 | 6/1986 | Ostlinning et al. | 528/388 |
| 4,598,144 | 7/1986 | Ostlinning et al. | 528/388 |

FOREIGN PATENT DOCUMENTS

| | | |
|---|---|---|
| 0065689 | 12/1982 | European Pat. Off. |
| 0073525 | 3/1983 | European Pat. Off. |
| 0086487 | 8/1983 | European Pat. Off. |
| 0100536 | 2/1984 | European Pat. Off. |
| 1620923 | 5/1970 | Fed. Rep. of Germany |

*Primary Examiner*—Harold D. Anderson
*Attorney, Agent, or Firm*—Connolly and Hutz

[57] ABSTRACT

This invention relates to a process for the preparation of high molecular weight, optionally branched polyarylene sulphides. These may be prepared from alkali metal sulphides and aromatic halogen compounds in a polar organic solvent in the absence of water.

5 Claims, No Drawings

PROCESS FOR THE PREPARATION OF HIGH MOLECULAR WEIGHT POLYARYLENE SULPHIDE IN THE ABSENCE OF WATER

This is a continuation of Ser. No. 608,497 filed May 9, 1984, abandoned.

This invention relates to a process for the preparation of high molecular weight optionally branched polyarylene sulphides. These may be prepared from alkali metal sulphides and aromatic halogen compounds in a polar organic solvent in the absence of water.

Polyarylene sulphides and their preparation are known: see. for example, U.S. Pat. Nos. 2,513,188, 3,117,620, 2,254,129, 3,524,835, 3,790, 536, 3,839,301, 4,048,259, 4,038,260, 4,038,261, 4,038,262, 4,056,515, 4,060,520, 4,064,114, 4,116,947, 4,282 347, DE-AS Nos. 2 453 485, 2 453 749, DE-OS No. 2 623 362, 2 623 363, 2 623 333, 2 930 797, 2 930 710, 3 019 732 and 3 030 488.

All these methods use starting materials which are partially dehydrated in a separate reaction step prior to their reaction to form polyarylene sulphides.

Thus, for example, the alkali metal sulphides used in the process according to DE-OS No. 3 030 488 have a water content of from 1 to 2.4 mol of water per mol of alkali metal sulphide. According to U.S. Pat. Nos. 4,056,515 and 4,060,520 several mols of water per mol of sulphur donor are left in the reaction mixtures after the preliminary removal of water. In U.S. Pat. No. 4,282,347, water is added to the reaction mixture after the process of dewatering in order to adjust the reaction mixture to a certain water content.

It has been found, however, that it is especially advantageous to dehydrate aqueous components by distillation, e.g. with the addition of an inert water carrier, before addition of the aromatic halogen compounds and thereafter to add the halogen compounds and carry out the reaction.

This dehydration may be carried out either in the presence of a polar organic solvent or solvent-free or only with H$_2$O carrier. The process may also be carried out with a combination of various solvents and/or carriers. The application of a vacuum may be advantageous, especially when dehydration is carried out solvent-free.

The process according to the invention has the further advantage that it may be carried out at normal or slightly raised pressure (0 to 2.5 bar).

This invention relates to a process for the preparation of optionally branched polyarylene sulphides from (a) 0–100 mol-%, preferably 50–100 mol-% of aromatic dihalogen compounds corresponding to the formula

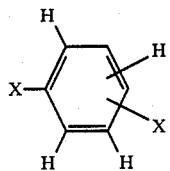

(I)

and 0–100 mol-%, preferably 0–50 mol-% of aromatic dihalogen compounds corresponding to the formula

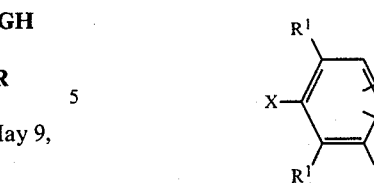

(II)

wherein
X represents halogens such as chlorine or bromine in the meta- or para-position to each other and
R$^1$, which may be identical or different, represents hydrogen, alkyl, cycloalkyl, aryl, alkylaryl or arylalkyl, and two groups R$^1$ in the ortho-position to each other may be linked together to form an aromatic or heterocyclic ring and one of the groups represented by R$^1$ is always different from hydrogen, and (b) 0–5 mol-% preferably 0.1–2.5 mol-%, based on the sum of aromatic dihalogen compounds of formulae I and II, of an aromatic trihalogen or tetrahalogen compound of the formula $$ArX_n \qquad (III)$$

wherein
Ar represents an aromatic or heterocyclic group,
X represents chlorine or bromine and
n represents 3 or 4, and (c) alkali metal sulphides, preferably sodium or potassium sulphide or mixtures thereof preferably in the form of their hydrates or aqueous mixtures, optionally together with alkali metal hydroxides such as sodium and potassium hydroxide, the molar ratio of (a+b):c lying within the range of 0.85:1 to 1.15:1, preferably 0.95:1 to 1.05:1, in (d) an organic solvent, optionally with the addition of catalysts and/or cosolvents, characterised in that the molar ratio of alkali metal sulphides (c) to the organic solvent (d) lies within the range of 1:2 to 1:15, the sodium sulphide is dehydrated solvent-free or in a polar organic solvent and/or with the aid of an H$_2$O carrier prior to the addition of the aromatic halogen compounds of formulae I, II or III, and the reaction is carried out at a temperature from 160° to 270° C., preferably from 170° to 250° C., optionally under excess pressure. The catalysts used for this purpose may be the usual substances used in the usual quantities e.g. alkali metal fluorides, alkali metal phosphates or alkali metal carboxylates. The catalyst is used in a quantity of 0.02 to 1.0 mol per mol of alkali metal sulphide.

The cosolvents used may be, for example. N,N-dialkyl carboxylic acid amides of C$_1$–C$_8$-aliphatic and C$_6$–C$_{12}$ aromatic carboxylic acids, used in a quantity of 0.02 to 1.0 mol, based on 1 mol of alkali metal sulphide.

R$^1$ in formula II preferably stands for hydrogen, C$_1$–C$_{20}$-alkyl, C$_{5-20}$-cycloalkyl, C$_6$–C$_{24}$-aryl, C$_7$–C$_{24}$-alkylaryl or C$_7$–C$_{24}$-aralkyl. Two groups R$^1$ in the ortho-position to each other may together form a condensed aromatic ring having a total of 6 carbon atoms or a condensed heterocyclic ring having 5 or 6 ring atoms and containing 1 to 3 hetero atoms such as N, O or S.

Ar in formula III preferably stands for an aromatic group having 6 to 24 carbon atoms, a heterocyclic group having 6 to 24 ring atoms, most preferably an aromatic group having 6 to 10 carbon atoms, or a heterocyclic group having 6 to 10 ring atoms and possibly containing up to 3 hetero atoms such as N, S or O.

The alkali metal sulphides are used in the usual quantities and in the usual manner. Examples of suitable alkali metal sulphides include lithium, sodium, potassium and rubidium sulphide, sodium and potassium sulphide being preferred. Alkali metal sulphides regenerated from hydrogen sulphides by means of alkali metal hydroxides such as LiOH, NaOH or KOH may be used. Mixtures of sulphides as well as mixtures of hydroxides may in all cases be used.

The sulphides may be dehydrated in a carrier, i.e. a suitable water carrier is added to the sulphides which contain water (of hydration), and the water is then distilled off azeotropically and the product isolated in the usual manner. Solvent-free dehydration of sulphides may also be carried out by storing the sulphides containing water (of hydration) over a dehydrating agent, e.g. over a water absorbent such as silica gel or $P_2S_5$-NaOH, optionally at reduced pressure. The sulphides containing water (of hydration) may also be dehydrated solvent-free by removal of the water by distillation at elevated temperature. The dehydrated sulphides are then used in the process according to the invention.

In another embodiment of the process according to the invention, the sulphides may also be dehydrated in a solvent. The solvent used for the reaction and the sulphide containing water (of hydration) are introduced into the reaction vessel and the water is then distilled off azeotropically, optionally with the addition of an inert water carrier.

According to the invention, aromatic meta- and paradihalogen compounds of formulae (I) and (II) may be used. In that case, the ratio of meta- compounds to para-compounds may be up to 30:70.

The process may be carried out at an excess pressure of up to 5 bar.

Aromatic para-dihalogen compounds are particularly preferred for producing polyphenylene sulphides which are to be processed thermoplastically.

For producing branched polyarylene sulphides, it is necessary to use aromatic trihalogen or tetrahalogen compounds of formula (III), preferably in an amount of at least 0.05 mol-%, based on the quantity of alkali metal sulphide put into the process.

The following are examples of aromatic dihalogen compounds of formula (I) which may be used according to the invention: p-Dichlorobenzene, p-dibromobenzene, 1-chloro-4-bromobenzene, 1,3-dichlorobenzene, 1,3-dibromobenzene, 1-chloro-3-bromobenzene and 1-chloro-3-bromobenzene. Each of these may be used singly or they may be used as mixtures. 1,4-Dichlorobenzene and/or 1 4-dibromobenzene are particularly preferred.

The following are examples of aromatic dihalogen compounds of formula (II) which may be used according to the invention: 2,5-Dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,4-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. These compounds may be used singly or as mixtures.

The following are examples of aromatic trihalogen and tetrahalogen compounds of formula (III) to be used according to the invention: 1,2,3-Trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl, and 1,3,5-trichlorotriazine.

Examples of suitable organic solvents for the purpose of this invention include N-alkyllactams, e.g, N-methylcaprolactam and N-ethylcaprolactam as well as other polar organic solvents in which the reaction components are at least partly soluble and which have a boiling point above 200° C.

The reaction time may be up to 24 hours but is preferably from 2 to 18 hours.

The reaction is generally carried out at atmospheric pressure. The application of excess pressure may be advantageous in special cases. The reaction is preferably carried out at a pressure of from 0.1 bar to 2.5 bar.

The water carriers may be compounds which form an azeotropic mixture with water and do not react with alkaline substances. Suitable examples include aromatic solvents such as benzene, xylenes and toluene and aliphatic solvents such as cyclohexane, octane and dibutylether.

When carrying out the process according to the invention, all the components with the exclusion of the aromatic halogen compounds may be brought together and dehydration may then be carried out, optionally with the addition of an inert carrier. Dehydration may also be carried out stepwise. When both water and carrier agent have been distilled from the mixture, the aromatic halogen compounds may be added and brought to reaction, optionally with previous addition of solvent.

The reaction mixture may be worked up and the polyarylene sulphides isolated by known methods.

The polyarylene sulphide may be isolated from the reaction solution by the usual methods such as filtration or centrifuging, either directly or e.g. after the addition of water and/or dilute acids. The polyarylene sulphide is generally washed with water after it has been separated or it may be washed or extracted with other liquids at the same time or subsequent to this washing with water.

The polyarylene sulphide may also be recovered, for example, by distillation of the solvent followed by washing as described above.

The polyarylene sulphides according to the invention may be mixed with other polymers or with pigments and fillers such as graphite, metal powder, glass powder, quartz powder or glass fibres or the usual additives for polyarylene sulphides may be added to them, e.g. the usual stabilizers or mould release agents.

The melt flow of polyarylene sulphides is generally determined according to ASTM 1238-70 at 316° C., using a 5 kg weight, and the result is given in g/10 minutes.

If the melt flow values are high, however, this method of measurement may give rise to difficulties due to the high outflow rates of the polymer melts. The melt viscosity $\eta m$ of the polymer melt (in Pa.s) at 306° C. has also been determined in dependence upon the shearing stress (in Pa.s) using an Instron Rotation viscometer.

This method enables the melt viscosity to be determined within a very wide range of from $10^{-1}$ to $10^7$ Pa.s. In the Instron Rheometer (Rheometer Model 3250 of Instron; diameter of cone and plate 2 cm), the polymer is melted between a fixed plate and a rotatable cone and the torque of the cone is determined. The melt viscosity can be calculated in dependence upon the shearing stress from the torque, the angular viscosity and the data of the apparatus.

The melt viscosity measured at a shearing stress of $10^2$ Pa is given.

Immediately after isolation from the reaction mixture, the polyarylene sulphides according to the invention generally have melt viscosities from $0.3 \times 10^3$ to $5 \times 10^6$ Pa.s, preferably from $1.5 \times 10^3$ to $10^4$ Pa.s, and good colour properties. They may be used directly for extrusion, extrusion blowing, injection moulding or other conventional processes for the production of foils, moulded articles or fibres. These may be used for the usual purposes, e.g. as motor car parts, dashboards, electrical equipment such as switches, electronic boards, chemically resistant and weather resistant parts and apparatus such as pump housings and pump impellers, dishes for etching baths, sealing rings, parts of office machines and telecommunication equipment, and domestic appliances, valves and parts of ball bearings.

COMPARISON EXAMPLE 1

Preparation of polyphenyl sulphide according to U.S. Pat. No. 3,354,129.

129 g of sodium sulphide trihydrate ( 1 mol $Na_2S$) and 300 g of N-methylpyrrolidone were together introduced into an autoclave equipped with stirrer. The mixture was flushed with nitrogen and slowly heated to 202° C. A total of 19 ml of water distilled off in the process (corresponding to a residual water content of 1.78 mol, based on the sodium sulphide).

The reaction mixture was then cooled to about 160° C. and 147 g of p-dichlorobenzene ( 1 mol) in about 50 g of methylpyrrolidone were added. The reaction mixture was heated to 245° C. for 30 minutes under a preliminary nitrogen pressure of 2.5 bar and maintained at this temperature for 3 hours. The pressure finally reached 14.5 bar. After cooling to room temperature, a grey solid was isolated, which was subsequently washed with water. The product was dried under vacuum at 80° C., and 100.3 g ( 93%) of poly-p-phenylene sulphide with a light brown colour were obtained. Melt viscosity: $\eta m = 4.5$ Pa.s (at $\tau = 10^2$ Pa).

This product cannot be thermoplastically processed without curing.

COMPARISON EXAMPLE 2

Similar to Comparison Example 1 but with the additional use of 1.81 g of 1,2,4-trichlorobenzene ( 1 mol-% based on dichlorobenzene) and the reaction was carried out at normal pressure. 48.9 g of light grey product ( 45.3% yield based on $Na_2S$) having a melt viscosity $\eta m < 1$ Pa.s (at $\tau = 10^2$ Pa) were isolated.

COMPARISON EXAMPLE 3

Similar to Comparison Example 1 but using N-methylcaprolactam as solvent. 85.2 g ( 76.7%) of a polyphenyl sulphide which was light grey in colour and had a melt viscosity of $\eta m < 1$ Pa.s (at $\tau = 10^2$ Pa) were obtained.

EXAMPLE 1

1110 g of N-methylcaprolactam, 305.2 g of sodium sulphide trihydrate ( 2.32 mol), 28.0 g of 50% NaOH, 500 g of toluene and 30.2 g of N,N-dimethylacetamide (15 mol-% based on $Na_2S$) were introduced into a 2 l three-necked flask equipped with thermometer, stirrer and water separator. 139.3 g of water were subsequently removed azeotropically and toluene was subsequently distilled off. After cooling to about 170° C., 341.1 g of 1,4-dichlorobenzene and 2.1 g of 1,2,4-trichlorobenzene (0.5 mol-% based on dichlorobenzene) were added and the reaction mixture was heated to reflux for 9 hours and the product isolated in the usual manner. 232.7 g of a white polyarylene sulphide were obtained ( 92.9% yield based on $Na_2S$, melt viscosity $\eta m = 2.2 \times 10^3$ Pa.s (at $\tau = 10^2$ Pa)).

EXAMPLE 2

305.2 g of $Na_2S$ trihydrate and 14 g of NaOH beads were introduced under nitrogen into a 2 l three-necked flask equipped with thermometer, stirrer and reflux condenser and the components were heated in an oil pump vacuum, initially at room temperature and finally at 230° C., at a pressure of <0.1 mm. After the addition of 1110 g of N-methylcaprolactam, 30.2 g of N,N-dimethylacetamide, 341.1 g of 1,4-dichlorobenzene and 1.05 g of 1,2,4-trichlorobenzene (0.25 mol-% based on dichlorobenzene), the mixture was heated under reflux for 9 hours and the product isolated in the usual manner. 234.3 g of a white polyarylene sulphide were obtained ( 93.4% yield based on $Na_2S$, melt viscosity $m = 1.6 \times 10^3$ Pa.s (at $\tau = 10^2$ Pa)).

EXAMPLE 3

305.2 g of sodium trisulphide trihydrate, 28 g of 50% NaOH and 1000 g of toluene were introduced into an apparatus as in Example 1. 139.2 g of water were separated azeotropically. 1110 g of N-methylcaprolactam were then added at the rate that toluene distilled off so that a further 1.2 g of water were removed by distillation. After cooling to 170° C., 30.2 g of N,N-dimethylacetamide (15 mol-% based on $Na_2S$), 341.1 g of 1,4-dichlorobenzene and 2.1 g of 1,2,4-trichlorobenzene were added and the mixture was heated under reflux for 9 hours. The white product, which was isolated in the usual manner weighed 230.8 g ( 92.1% yield) and had a melt viscosity of $m = 2.0 \times 10^3$ Pa.s (at $\tau = 10^2$ Pa).

EXAMPLE 4

1110 g of N-methylcaprolactam 305.2 g of sodium sulphide trihydrate, 28.0 g of 50% NaOH and 30.2 g of N,N-dimethylacetamide (15 mol-% based on $Na_2S$) were introduced into a 2 l three-necked flask equipped with thermometer, stirrer and column head. The mixture was slowly heated to 230° C. under a stream of nitrogen with vigorous stirring and maintained at this temperature for 2 hours. A total of 158.9 g of a mixture of water and N-methylcaprolactam containing 139.1 g of $H_2O$ distilled over during this time. After the addition of 341.1 g of 1,4-dichlorobenzene and 2.5 g of 1,2,4-trichlorobenzene (0.6 mol-% based on dichlorobenzene), the reaction mixture was heated under reflux for 9 hours and the product was isolated in the usual manner. 229.9 g of a white polyarylene sulphide were obtained ( 91.5% yield based on $Na_2S$, melt viscosity $m = 3.4 \times 10^3$ Pa.s (at $\tau = 10^2$ Pa)).

EXAMPLE 5

This is similar to Example 1 but without 1,2,4-trichlorobenzene and with the aid of N-ethylcaprolactam as solvent. 215.2 g of a white polyphenylene sulphide were obtained ( 84.1% yield based on $Na_2S$, melt viscosity $\eta m = 57$ Pa.s (at $\tau = 10^2$ Pa)).

We claim:

1. Process for the preparation of high molecular weight polyarylene sulphide having a viscosity of from $0.3 \times 10^3$ to $5 \times 10^6$ Pascal units which comprises reacting in the absence of water
   (a) 0–100 mol-% of at least one aromatic dihalogen compound corresponding to the formula

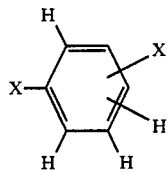
(I)

and 100–0 mol-% of at least one aromatic dihalogen compound corresponding to the formula

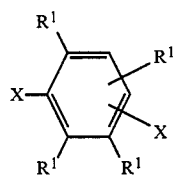
(II)

wherein

X represents halogens in the meta- or para-position to each other and $R^1$, which is identical or different, represents hydrogen, alkyl, cycloalkyl, aryl, alkylaryl or arylalkyl and two groups $R^1$ in the ortho-position to each other are linked together to form an aromatic or heterocyclic ring and one group $R^1$ is invariably different from hydrogen and (b) 0–5 mol-% based on the sum of components (a) and (b), of an aromatic trihalogen or tetrahalogen compound corresponding to the formula $$ArX_n \qquad (III)$$

wherein

Ar represents an aromatic or heterocyclic group,

X represents chlorine or bromine and n represents 3 or 4, and (c) alkali metal sulphide alone or together with alkali metal hydroxide, the molar ratio of (a+b):c is within the range of 0.85:1 to 1.15:1, and
   (d) in an organic solvent which is an N-alkyllactam having a boiling point above 200° C., characterized in that the molar ratio of alkali metal sulphide (c) to organic solvent (d) is within the range of 1:2 to 1:15 and the alkali metal sulphide is dehydrated either solvent-free or in a polar organic solvent with or without the aid of an inert $H_2O$ carrier before addition of the aromatic halogen compounds of formulae I, II or III.

2. Process according to claim 1 wherein the reaction temperature is from 170° to 270° C.

3. Process according to claim 1 wherein the polar organic solvent is N-methylcaprolactam or N-ethylcaprolactam.

4. Process according to claim 1 wherein (d) further comprises, N,N-dialkylcarboxylic acid amide as cosolvent.

5. Process according to claim 1 wherein toluene is the inert carrier.

* * * * *